US 9,852,309 B2

(12) United States Patent
Luria

(10) Patent No.: US 9,852,309 B2
(45) Date of Patent: Dec. 26, 2017

(54) SYSTEM AND METHOD FOR SECURING PERSONAL DATA ELEMENTS

(71) Applicant: PRIFENDER LTD., Tel Aviv (IL)

(72) Inventor: Nimrod Luria, Netanya (IL)

(73) Assignee: PRIFENDER LTD., Tel Aviv (IL)

( * ) Notice: Subject to any disclaimer, the term of this patent is extended or adjusted under 35 U.S.C. 154(b) by 86 days.

(21) Appl. No.: 14/987,793

(22) Filed: Jan. 5, 2016

(65) Prior Publication Data
US 2017/0193249 A1  Jul. 6, 2017

(51) Int. Cl.
G06F 21/60 (2013.01)
G06F 21/62 (2013.01)
H04L 29/06 (2006.01)

(52) U.S. Cl.
CPC ........ *G06F 21/6245* (2013.01); *G06F 21/604* (2013.01); *G06F 21/6263* (2013.01); *H04L 63/04* (2013.01)

(58) Field of Classification Search
CPC .................................................. G06F 21/6245
See application file for complete search history.

(56) References Cited

U.S. PATENT DOCUMENTS

| 5,987,440 | A * | 11/1999 | O'Neil | G06Q 10/10 |
| | | | | 705/39 |
| 6,275,824 | B1 | 8/2001 | O'Flaherty et al. | |
| 6,317,783 | B1 | 11/2001 | Freishtat et al. | |
| 7,111,172 | B1 * | 9/2006 | Duane | H04L 63/0272 |
| | | | | 380/277 |
| 7,734,600 | B1 | 6/2010 | Wise et al. | |
| 2002/0023059 | A1 * | 2/2002 | Bari | G06F 21/41 |
| | | | | 705/76 |
| 2002/0078346 | A1 * | 6/2002 | Sandhu | H04L 9/14 |
| | | | | 713/156 |
| 2007/0115940 | A1 * | 5/2007 | Kamen | H04L 63/0853 |
| | | | | 370/352 |

(Continued)

OTHER PUBLICATIONS

Pearson; Taking account of privacy when designing cloud computing services; Published in: Proceeding CLOUD '09 Proceedings of the 2009 ICSE Workshop on Software Engineering Challenges of Cloud Computing; pp. 44-52; May 23-23, 2009; ACM Digital Library.*

(Continued)

*Primary Examiner* — Bradley Holder
(74) *Attorney, Agent, or Firm* — The Roy Gross Law Firm, LLC; Roy Gross

(57) ABSTRACT

A system and method may obtain a connection profile, the connection profile including at least one rule related to at least one PII data element; associate the connection profile with a network connection; receive a data unit transmitted over the network connection, the data unit including at least a portion of the PII data element; and, based on the rule, perform at least one of: blocking transmission of the data unit, modifying the data unit, forwarding at least a portion of the data unit to a selected destination, storing the data unit, storing metadata related to the data unit, and reporting an event related to the data unit. A system and method may associate the connection profile with a set of connection. A system and method may automatically modify a set of connection profiles based on an event.

20 Claims, 3 Drawing Sheets

(56) References Cited

U.S. PATENT DOCUMENTS

| | | | |
|---|---|---|---|
| 2009/0119222 A1* | 5/2009 | O'Neil | G06Q 10/10 705/76 |
| 2010/0094758 A1 | 4/2010 | Chamberlain et al. | |
| 2010/0117799 A1* | 5/2010 | Dormer | G06F 19/322 340/10.1 |
| 2010/0122083 A1* | 5/2010 | Gim | G06F 21/6245 713/162 |
| 2010/0177193 A1* | 7/2010 | Flores | G08B 13/126 348/148 |
| 2010/0185871 A1* | 7/2010 | Scherrer | G06F 21/6218 713/186 |
| 2010/0212003 A1* | 8/2010 | Barillaud | G06F 21/6263 726/8 |
| 2011/0302634 A1* | 12/2011 | Karaoguz | G06Q 20/10 726/4 |
| 2013/0197938 A1 | 8/2013 | Bayouk et al. | |
| 2013/0332987 A1 | 12/2013 | Tenneti et al. | |
| 2015/0103672 A1 | 4/2015 | Stuart | |
| 2015/0199541 A1* | 7/2015 | Koch | G06F 21/31 726/29 |

OTHER PUBLICATIONS

Angin et al.; An Entity-Centric Approach for Privacy and Identity Management in Cloud Computing; Published in: Reliable Distributed Systems, 2010 29th IEEE Symposium on; Date of Conference: Oct. 31-Nov. 3, 2010; IEEE Xplore.*

Search Report and Written Opinion—Corresponding PCT Application No. PCT/US2017/012084, dated Mar. 13, 2017, 13 pages.

* cited by examiner

SYSTEM AND METHOD FOR SECURING PERSONAL DATA ELEMENTS

FIELD OF THE INVENTION

The present invention relates generally to securing data elements. More specifically, the present invention relates to securing data elements related to personal or private information.

BACKGROUND OF THE INVENTION

Systems and methods for protecting or securing data are known in the art. For example, a firewall may prevent access into a private or protected network based on port filtering. Other systems use access permissions in order to restrict access to files or folders in a storage system.

SUMMARY OF THE INVENTION

In some embodiments, a connection profile including at least one rule related to at least one personally identifiable information (PII) data element may be created and may be associated with a network connection. A data unit including at least a portion of the PII data element may be received. Based on a rule, at least one of: blocking transmission of the data unit, modifying the data unit, forwarding at least a portion of the data unit to a selected destination, storing the data unit, storing metadata related to the data unit, and reporting an event related to the data unit may be performed.

In some embodiments, a system and method may associate a connection profile with a set of connections. A set of connection profiles may be automatically modified based on an event. A map of flows of data elements may be graphically presented to a user. A data element may be associated with a token and an action may be performed based on a token identified in a data unit. A data element in a data unit may be modified based on a connection profile.

A user profile that includes at least one rule related to at least one data element may be obtained and the user profile may be associated with a set of network connections. A data unit transmitted over one of the network connections and including a data element related to the user may be intercepted, and, based on a rule, at least one of: blocking transmission of the data unit, modifying the data unit, forwarding at least a portion of the data unit to a selected destination, storing the data unit, storing metadata related to the data unit, and reporting an event related to the data unit may be performed.

Metadata related to transaction, of at least a portion a PII data element, from a protected system to an external system, may be stored, and a flow of PII data elements between the protected system and an external system may be presented based on stored metadata. An embodiment of the invention may present, to a user, PII data elements obtained by an external system, may receive from the user indication of restricted PII data element, and may prevent the restricted PII element from being transferred to the external system. An embodiment of the invention may store metadata related to a transaction, from a first external system to a second external system, of at least a portion a PII data element, and present to a user a flow of PII data across a plurality of external systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
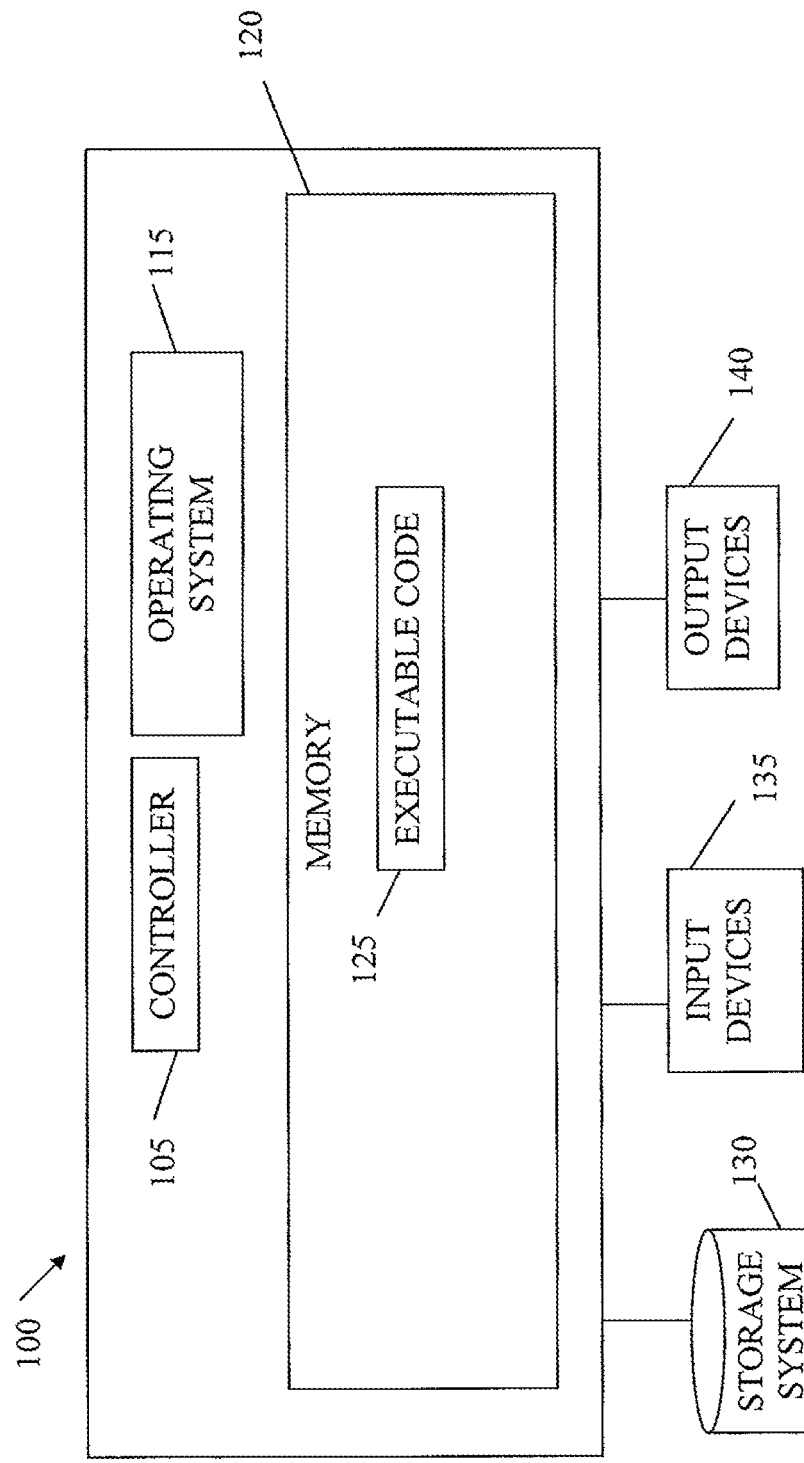
FIG. 1 shows high level block diagram of an exemplary computing device according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, an executable code 125, a storage system 130, input devices 135 and output devices 140. Controller 105 may be configured to carry out methods described herein, and/or to execute or act as the various modules, units, etc. More than one computing device 100 may be included, and one or more computing devices 100 may act as the various components, for example, security enforcement unit (SEU) 220 and SEU 230 shown in FIG. 2 and described herein may be, or may include, components of computing device 100 such as controller 105 and memory 120.

For example, by executing executable code 125 stored in memory 120, controller 105 may be configured to carry out a method of securing data elements as described herein. For example, controller 105 may be configured to associate a connection profile with a network connection and, based on a rule in the connection profile, block or modify a personally identifiable information (PII) data element transmitted over the network connection.

A network connection as referred to herein may be any network connection or link as known in the art. For example, a network connection may be, or may be defined by, one or more internet protocol (IP) addresses and ports or a set of transmission control protocol (TCP) ports and the like. A network connection may be, or may include, a physical connection, e.g., a wire. A network connection may be a wireless connection as known in the art. Receiving or obtaining data transmitted over a network connection may be done using systems and methods known in the art. For example, using a network sniffer known in the art, SEU 220 may capture, intercept or otherwise obtain and store, any data transmitted over network connection 224.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Embodiments of the invention may include a non-transitory computer-readable storage medium having stored thereon instructions which when executed by a processor cause the processor to carry out methods as described herein. For example, memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security measures related to personal or private data elements as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., security enforcement units 220 and 230 shown in FIG. 2 and described herein) may be, or may include, controller 105, memory 120 and executable code 125.

Storage system 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Figure 2:
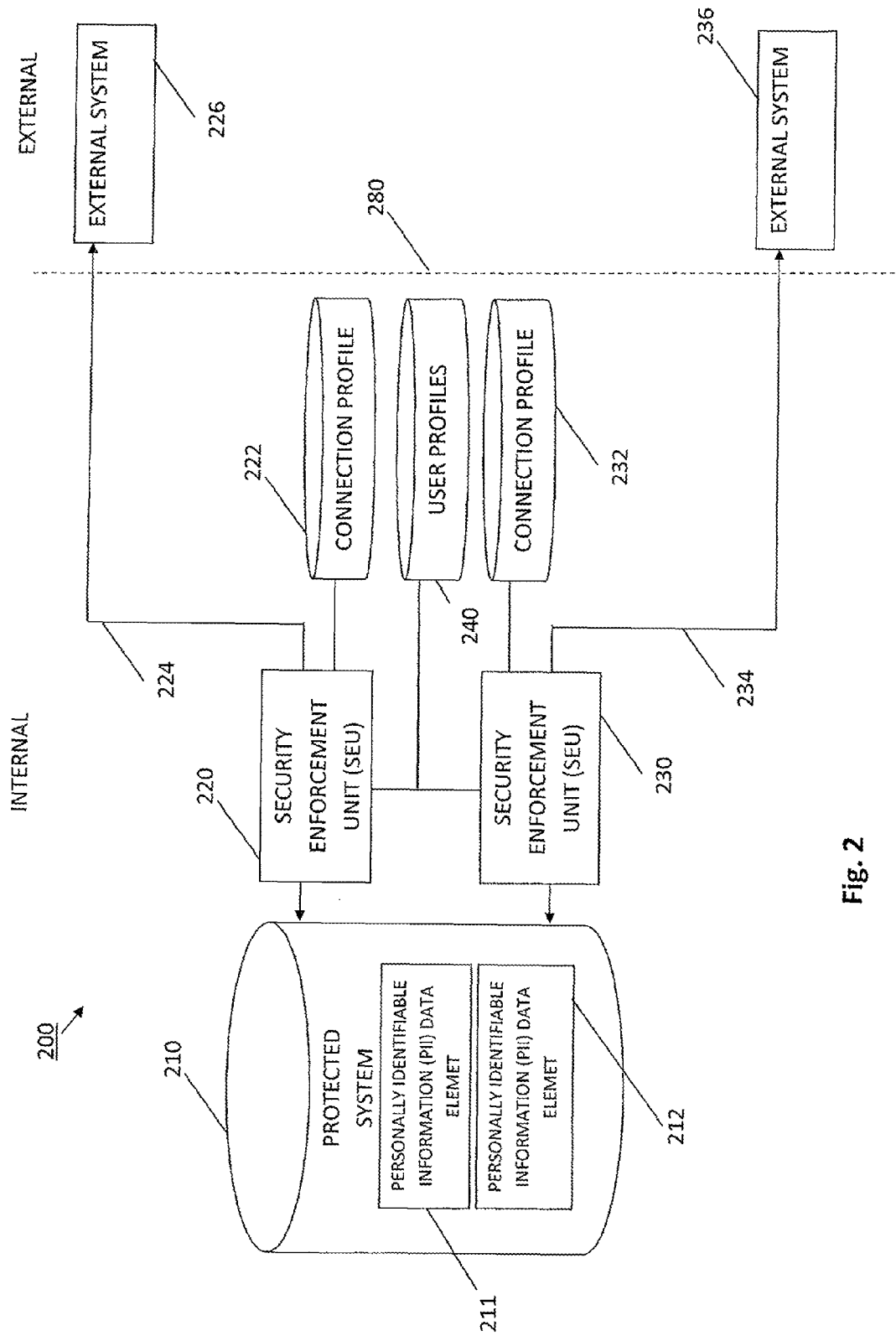
FIG. 2 is an overview of a system according to illustrative embodiments of the present invention.

Reference is made to FIG. 2, an overview of a system 200 according to some embodiments of the present invention. As shown, a system 200 may include SEU 220 and SEU 230. As further shown, a system may include user profiles 240. As shown, an external system 226 may be connected to a protected system 210 over a network connection 224. Similarly and as shown, external system 236 may be connected to protected system 210 over a network connection 234. As illustrated by dashed line 280, external systems 226 and 236 may be external to protected system 210. For example, protected system 210 may be a system inside an organization (e.g., a server connected to an intranet of an organization) and connections 224 and 234 may connect the organization to the internet or the outside world. Although SEU's 220 and 230, connections profiles 222 and 232 and user profiles 240 are shown in the internal side, other configurations may be contemplated. For example, SEU 220 may be placed on a border between an internal network and the internet, e.g., the way gateways are installed as known in the art. As described herein, the definition of an internal and/or external system may be based on a user input, for example, by configuring SEU 230 to control transmission of PII data elements from a first system to a second system, a user may define the first system as an internal one and the second system as an external system, e.g., the second system may be treated by an embodiment of the invention as external to the first system.

Generally, an external system as referred to herein may be any system (e.g., server) that is connected to a protected system via a network that is not controlled by the owner or operator of the protected system. For example, an internal or protected system (e.g., system 210) may be a set of servers of, or owned or controlled by, a medical institution (e.g., a hospital or a medical center) and an external system (e.g., external system 226) may be a set of servers owned or operated by a bank. Some information may be exchanged between a protected and external system, for example, in order to facilitate payment for medical services provided by a medical center that operates protected system 210, communication with an external system 236 that is operated by a bank may be required. As described herein, a system and method according to some embodiments of the invention may monitor and control the sharing of PII data between an internal or protected system (e.g., a computing system of a hospital) and a system that is external to the protected system (e.g., a system operated by a bank, a government etc.). A definition of what is a protected system and/or what a protected system includes may be received from a user. For example, a user may define the network connections to be monitored and controlled as described such that any set of servers or any system is protected. Similarly, an external system may be user defined. For example, by configuring a system to monitor and control network connections 224 and 234 as described and assuming these are the only connections between protected system 210 and external systems 226 and 236, a user may define systems 226 and 236 as external systems and system 210 as a protected system.

As further shown, connection profile 222 may be associated (e.g., by ESU 220) with connection 224 and, similarly, profile 232 may be associated (e.g., by SEU 230) with connection 234. For the sake of clarity and simplicity, only two external systems and their respective connections are shown. However, it will be understood that a system according to some embodiments of the invention may include, or be connected to, any number of external systems. Accordingly, any number of connections between a protected system 210 and any number of external systems may be supported by a system and method according to some embodiments of the invention. As shown, a protected system 210 may include PII data elements 211 and 212. Although two separate SEU's (220 and 230) are shown, other configurations may be possible. For example, a single SEU may be connected to, or may access, a plurality of connections profiles (e.g., connection profiles 222 and 232) and the single SEU may enforce security measures on a plurality of connections to a plurality of external systems.

Protected system 210 may be any application or storage system that stores or includes personal, sensitive or private data. For example, protected system 210 may be, or may include components of, computing device 100, e.g., protected system 210 may be a server and storage system inside an organization's network. For example, protected system 210 may be owned and managed by a medical center and, accordingly, private and sensitive information may be stored, e.g., as shown by PII data elements 211 and 212, in a disk included in protected system 210.

PII data elements 211 and 212 may be PII data elements as known in the art, e.g., PII data elements 211 and 212 may include for example a name, address, medical information, phone number, electronic mail (email) address, financial data and the like. Personal data elements, e.g., as shown by PII data elements 211 and 212, may be, or may be included in any suitable object or structure, e.g., a file, an entry or record in a database and so on.

SEU 220 may be any unit or module adapted to monitor data transmitted over network connection 224. SEU 220 may be any unit or module adapted to identify data elements transmitted over network connection 224. For example, using (or including) a network sniffer as known in the art, SEU 220 may identify or determine that data elements such as PII data elements 211 or 212, or portion of data elements, are being sent over network connection 224.

SEU 220 may be any unit or module adapted to block transmission of a data unit or data element on network connection 224, or modify a data unit transmitted on network connection 224.

A data unit as referred to herein may be any suitable data object. For example, a data unit may be a network packet or message as known in the art or a data unit may be a record in a database, e.g., a customer record that includes data elements such as name, home address, age etc. It will be understood that systems and methods according to some embodiments of the invention may identify, detect and process data elements included in any object, block of data, or data unit. Accordingly, some embodiments of the invention may receive, intercept or otherwise obtain, a data unit transmitted over a network connection, the data unit including at least a portion of the PII data element, may extract data elements or portions thereof from the data unit, and perform operations related to management of sharing of data elements as described herein.

As further described herein, SEU 220 may forward at least a portion of a data unit to a selected destination or it may store the data unit and/or metadata related to the data unit (e.g., record or log an event as described herein). SEU 220 may report, log or record an event related to the data unit, e.g., alert an administrator when detecting that sensitive data is being accessed by an external system. SEU 230 may be similar to SEU 220.

Connection profile 222 may be any digital object, e.g., a file stored in a storage system accessible to SEU 220 or a memory segment. For example, connection profile 222 may be stored in storage system 130 or in memory 120 and controller 105 may thus be enabled to use connection profile 222 as described herein. User profiles 240 may be a set or plurality of user profiles that include rules, criteria or other data related to users. For example, a user profile may indicate that specific data elements of the user may not be transmitted to, or shared with, a specific one or more external system. For example, a first user profile may indicate that an email of the user may be sent to, or shared with, external system 226 but that the email must not be sent to, or shared with external system 236. In other cases, a user profile may forbid sharing a data element with any external system. In yet other cases, a user profile may include an indication, for specific data elements or portions of a data elements stored in protected system 210, whether or not they may be shared with external systems. For example, a user profile may indicate that the user's name may be freely shared with external systems, but the user's home address may not be shared with external systems.

External systems 226 and 236 may be servers or computer applications. For example, external system 226 may be a server and/or application of an organization that provides services to the owner of protected system 210. Accordingly, data may be exchanged between protected system 210 and external systems 226 and 236. As described, some of the data flow between protected system 210 and external system 226 may be allowed or enabled and some data flow may be blocked or prevented. For example, based on a connection profile associated with a connection (e.g., connection profile 222 may be associated with connection 224), some of the data sent from protected system 210 over network connection 224 may be blocked, modified, reported and so on. Association of a connection profile with a network connection may be, or may include, configuring an SEU to use the associated connection profile when monitoring or enforcing security on a network connection. For example, associating network connection 224 with connection profile 222 may include providing connection profile 222 to SEU 220 and/or configuring SEU 220 to use rules and other data in connection profile 222 in order to enforce security on network connection 224.

Accordingly, a system and computer-implemented method according to some embodiments of the invention may obtain a connection profile, the connection profile including at least one rule related to at least one personally PII data element.

In some embodiments, a connection profile may be defined and/or created based on input from a user. A connection profile may include one or more rules related one or more personally identifiable information (PII) data elements. For example, a user may want to allow customer names stored in protected system 210 to be shared with external system 226 but prevent sharing of email addresses of the customers. In such exemplary case, connection profile 222 may be created or updated such that a data element including a name is allowed to be forwarded to external system 226 but a data element that includes an email is blocked or deleted.

For example, a connection profile may include the information as shown in Table 1 below:

TABLE 1

| Data element | Block | Log | Modify/ Delete | Alert | USER ID | ACCESS ID | Forward |
|---|---|---|---|---|---|---|---|
| Email address | No | Yes | No | No | Token-A | Token-C | |
| Name | Yes | No | No | Yes | Token-B | * | 32.182.61.23 |
| Home address | No | Yes | Yes | No | * | * | |

As described, a connection profile may include rules related to personally identifiable information (PII) data elements. For example, rules for data elements are shown in Table 1 and further described herein. For example, if connection profile 222 includes the information shown in Table 1 and is further associated with network connection 225, then using it as shown in FIG. 1, SEU 220 may allow an email address to be forwarded to external system 226 (this rule is reflected in the "No" under "Block" in Table 1) and SEU 220 may log or record that an email address was forwarded. Since, in the example above, the alert and modify actions for the email address data element are not set, SEU 220 may avoid logging or recording the event. Using Table 1 as connection profile 222, SEU 220 may block a data element that includes a customer's name and may further generate an alert if an attempt to send a name from protected system 210 to external system 226 over connection 224 is identified or detected. For example, an alert may include a pop-up window on an administrator screen, sending a text message, sounding an alarm using speakers of a computer, sending an email message and the like. For example, blocking a data element or data unit may include discarding the data element or unit without sending or forwarding it to its destination.

Using Table 1 as connection profile 222, SEU 220 may log or record an event that includes sending a data element that includes a home address of a user, customer or person. For example, logging or recording an event may include storing (e.g., in storage system 130), the type of data element (e.g., home address), the time and date the data element was detected, the source and destination of the data unit that includes the data element, a user or application that requested the data element, a user or application that sent the data element and/or any other data or metadata related to a transaction of a data element. Recording or logging an event may include storing, in a database, the entire data unit or entire data element, e.g., as received or obtained.

Using Table 1 as connection profile 222, SEU 220 may modify or delete a data element or a portion thereof. For example, a home address may be modified, for example, scrambled or otherwise encrypted, e.g., such that using a key, the home address can be reconstructed from an encrypted version. In another case, the home address or another data element may be replaced by content. For example, SEU 220 may replace a name, address or other PII data element with text such as "content automatically removed by a security unit". A data element (e.g., home address when using Table 1 as a connection profile) may be deleted. For example, a data unit that includes a home address data element and additional data elements may be intercepted by SEU 220, SEU 220 may delete or remove the home address data element from the data unit and forward the data unit (that no longer includes the home address data element) to external system 226.

A system and method according to some embodiments of invention may perform an action related to sharing PII data elements based on the user related to the data (e.g., the user to whom a PII data element pertains) and/or based on the user or application who accesses (or attempts to access) the PII data elements. In some embodiments, any of: a PII data element; a user; and/or an application may be associated with a token and an action performed may be based on a token identified in the data unit or other message sent over a network.

For example, as shown by Table 1, tokens may be used to identify users and entities. Tokens used by some embodiments of the invention may be as known in the art. Any system and method as known in the art may be used in order to generate (possibly unique) tokens for users and applications, insert tokens into messages and extracting tokens from messages. For example, as known in the art, tokens are used to represent credit card numbers such that an actual card number needs not be stored and/or communicated over networks (thus increasing security). In a similar way, tokens may be generated by a system, e.g., for users, and the tokens may be included in messages that include PII data elements. For example, assuming that the token "13579" is associated with a user named "John Doe", when PII data elements of John Doe are sent in a message, the token "13579" may be included in the message. Similarly, when a request from a user or application is sent, e.g., to protected system 210, a token that identifies the user or application may be inserted into the request. Accordingly, sharing of PII data elements may be controlled based on the user to which the data belongs or pertains and based on the user or application that requests the PII data elements.

For example, the "USER ID" column in Table 1 may indicate, for each entry in a connection profile, to which user the entry applies. For example, the rule for the email address data element in Table 1 may be applicable to a user identified by token "Token-A", the rule for the name data element may be applicable to a user identified by token "Token-B", and the rule for the home address may be applicable to any user as indicated by the "*". As described, rules may be related to the entity that accesses (or attempts to access) a data element. For example and as shown, the rule for the email address in Table 1 may be applicable to an entity associated with (or identified by) the token "Token-C".

Accordingly, rules in a connection profile may be configured such that access to PII data element of specific user by a specific user or application is controlled. For example, using configurations as shown in Table 1, some embodiments of the invention may allow only one specific user or application to access PII data of a specific user.

Logging or recording as described herein may include user identification such that some embodiments of the invention may report operations related to a specific user or a specific data element. For example, when logging accesses made to PII data elements as described, SEU 220 may include user tokens in the log data. Accordingly, some embodiments of the invention may answer a question such as "who accessed data of John Doe?", what are the specific PII data elements of John Doe that were accessed or shared in the past 24 hours?", "What are the PII data elements (of all users) accessed in the past week?" and so on.

It will be understood that Table 1 and the rules discussed above are exemplary and simplified rules and that a network connection profile may include complex rules. For example, a rule may be related to a request related to a PII data element, e.g., an action performed by an SEU may be based on the request, e.g., who the source, requester, or requestor, for the data element. A rule in a connection profile may be related to a method or system used for requesting or providing the data element (e.g., responses to batch requests may be blocked). A rule in a connection profile may be related to a time or date, e.g., some data elements may not be shared during specific times (e.g., after work or office hours). A rule in a connection profile may be related to a frequency of accessing a PII data element, e.g., data elements rarely accessed or requested may not be shared and data elements frequently shared may be allowed to be shared. A rule in a connection profile may be related to the user or application requesting (or attempting to access) a data element. A rule in a connection profile may be related to the storage system that stores or includes the data element, e.g., data element from a first server or database in an organization may be shared with an external system but data element in a second server or database may not be shared, e.g., they may be blocked as described. A rule in a connection profile may be related to a flow. For example, data elements requested during a backup procedure or flow may be forwarded but blocked otherwise. A rule in a connection profile may be related to pattern, e.g., sharing of data elements related to, or requested in, a known pattern that includes a sequence of predefined requests may be allowed or blocked based on a rule for the pattern.

Systems and methods according to some embodiments of the invention may create and/or update connection profiles, rules and policies based on user input. For example, using a web browser, a user (e.g., an administrator or privileged user) may access sensitive information, e.g., PII data elements 211 and 212 that may be displayed in the web browser. For example, an administrator may use a web browser in external system 226. As described, PII data elements 211 and 212 may include a social security number (SSN), phone number and email address and home address of a user. Specific data elements may be marked or indicated when presented to an administrator, e.g., during a setup or configuration phase. For example, SEU 220 or another unit may modify information presented to the administrator, e.g., data elements or fields such as SSN, phone number, email and full address may be highlighted when shown to the administrator. For example, if an SSN is included in data sent to an administrator as described, the SSN may be automatically highlighted by a system or method in order to draw the attention of the administrator to the fact that sensitive or private information is being sent from a protected system.

During a configuration or a setup phase, sensitive data elements or fields (e.g., highlighted as described) may be clicked by an administrator in order to indicate to a system and/or method according to some embodiments of the invention that a rule for a clicked on data element is to be created or updated. When a data element is clicked on, a screen may be opened by a configuration unit (e.g., one executed as a plug-in in the administrator web browser) and, using the screen, the administrator may then configure rules for the data element. For example, the administrator may configure rules such as the rules described above with reference to Table 1.

For example, for an SSN data element, the administrator may configure a rule or policy for a specific connection (e.g., by indicating a source and destination network address, e.g., IP addresses). A configured rule or policy may include an action, e.g., block the data element (e.g., prevent the data element from being sent from a source address to a destination address), delete the data element or modify the data element as described. As described, a rule or policy may be configured for specific data elements, e.g., an administrator can set a rule that blocks or prevents sending an email address and another rule that modifies a credit card number (e.g., deletes some of the numbers leaving only a portion of the credit card number, or leaving only a city in a full address data element).

Data elements may be found in any file or object being sent from a protected system to an external system. For example excel files are known in the art and are frequently used to communicate information. Some embodiments of the invention may examine content in excel or other files, identify sensitive or private information in the files and apply rules or policies to the information as described herein.

Any logic may be used to create or update rules and policies. For example, rules and policies may be set according to the set of questions: who, how and why. For example, a rule for a data element may be set based on who is accessing the data element (e.g., what user or what organization is accessing the data element), how (e.g., how is the user accessing the data element, over a secured network?, over a social network?, from within a protected system? etc.) and why or what for the data element is being accessed (e.g., for a backup?, for a monthly report etc.).

For example, a rule may include allowing a first user to access a data element but preventing a second user from accessing the data element. A rule may allow a data element to be accessed for backup but not for downloading the data element to a private computer. A rule may allow a data element to be accessed over a first network but prevent accessing the data element when accessed over a second network.

For example, an Excel™ spreadsheet or other spreadsheet file that includes a PII data element may be hosted at the "google docs" or other cloud or remote file storage service. When the Excel file is accessed using a connection with, or from, a trusted party (e.g., a party known to SEU 220 as trusted) then, using a rule (e.g., in connection 222) SEU 220 may allow users' emails and first names to be sent to the trusted party but block other PII data elements, e.g., block users' home address from being sent to the trusted party over the connection.

SEU 220 may generate rules or policies based on machine learning. For example, during a learning phase, rules may be automatically created and stored in connection profile 222, by SEU 220. For example, based on PII data elements being shared during a learning phase, SEU 220 may create rules that allow sharing of the shared PII data elements.

A connection profile may be associated with and/or created and updated for, any type of connection. For example, a connection may be defined by a source address and a destination address (e.g., source and destination IP addresses) or it may be a connection implemented by a specific system or infrastructure (e.g., a wired connection). A connection may be any connection between two organizations, e.g., a connection as defined by a system may include, or used for, all digital data communicated between two organizations. For example, a system and method according to some embodiments of the invention may create, use, and update a connection profile for all the network connections that connect two organizations or for all data communicated over a specific wired, physical connection and/or for all data communicated or exchanged over a connection defined by IP addresses as known in the art.

As described, a connection profile may be created based on user input. In some embodiments, a network connection profile may be created automatically, e.g., by an SEU. For example, either continuously or during a learning phase, SEU 220 may learn the of traffic over network connection 224, e.g., log or record which data elements are frequently shared with external system 226 and may use any statistical or heuristics in order to update or generate rules and policies in connection profile 222. For example, SEU 220 may create a rule in connection profile 222 that blocks data elements that are rarely requested.

By observing data, information and metadata related to rules as described, an SEU (e.g., SEU 230) may store, create, modify or update any of the rules described herein, in a connection profile. For example, SEU 220 may automatically update rules in a connection profile based on any of: a request related to a PII data element, a response related to the PII data element, a source of a request related to the PII data element, a method or system used for accessing the PII data element, a time when the PII data element was accessed, a frequency of accessing the PII data element, a user accessing the PII data element, an application accessing the PII data element, a storage system or location of the PII data element, a flow that includes accessing the PII data element and a pattern related to accessing the PII data element. For example, SEU 230 may use any logic or heuristics as described herein in order to create, store or update rules in a connection profile.

For example, SEU 220 may define, create or update a rule in connection profile 222 based on a flow that includes accessing the PII data element or based on a pattern related to accessing a PII data element. For example, by monitoring and recording or logging access operations related to a PII data element (e.g., during a learning stage), SEU 220 may identify a flow that includes accessing, by a backup application, a set of PII data elements every day at the same time. For example, an automated daily backup application may read specific PII data elements every day or once a week at 18:00, such pattern may be identified by SEU 220 as legitimate and may therefore be allowed, e.g., SEU may allow the backup application to access the PII data elements every day or once a week at 18:00 but may forbid or prevent access to the PII data elements at other times and/or by other applications. A flow or pattern may include a sequence of accesses to a set of PII data elements. For example, during a learning stage, SEU 220 may identify that an application always accesses a first PII data element and then accesses a second PII data element (e.g., a PII data element the includes an address of a user is always accessed or read after reading or accessing a PII data element that includes the user's name). Such pattern or flow may be recorded by SEU 220 (e.g., in connection profile 222 or in user profile 240) and the pattern or flow may be allowed or permitted by SEU 220. For example, if an allowed, recognized or identified pattern or flow includes accessing an address of a user after accessing the name of the user as described then SEU 220 may allow such sequence of accesses but, if an application attempts to access the address of the user without first accessing the user's name then SEU 220 may identify or determine that the access attempt is not according to a known or recognized pattern or flow and may prevent the access attempt, e.g., block a transmission of a PII data element that includes the user's address as described.

In some embodiments, SEU 220 may automatically modify a set of connection profiles based on an event. For example, ESU 230 may include, or be provided with, a set of event identifications, events classifiers or characteristics of events and logic, and may, based on an event, create a rule. For example, based on an attempt, made from external system 236, to access a specific data element in protected system 210 (e.g., access data element 112), possibly at a specific time of day, SEU 230 may insert a new rule into connection profile 232 that prevents sharing any data of a person who's personal data is included in the specific data element.

Accordingly, a system and method according to some embodiments of the invention may receive or obtain a data unit transmitted over a network connection, wherein the data unit including at least a portion of a PII data element and may, based on a rule, perform at least one of: blocking transmission of the data unit; modifying the data unit, forwarding at least a portion of the data unit to a selected destination, storing the data unit, storing metadata related to the data unit, and reporting an event related to the data unit. Rules may include tokens. Tokenization of data elements is known in the art. For example and as known in the art, credit card numbers are tokenized such that they are less exposed to exploitation. Data elements as described herein may be tokenized. For example, tokenizing may include associating user identities or data elements with tokens, numbers or values, e.g., "home address"=17, "name"=32 and so on. For example, a user token may be used to encrypt PII data elements of the user, accordingly, by obtaining user tokens, SEU 220 may decrypt PII data elements and process, or act based on, the decrypted PII data elements as described. Some embodiments of the invention may use tokens instead, or in addition to, other identifiers of data elements. For example, Table 1 may include, in the "Data element" column, a token value of the data element, tokens may be detected or identified in data units transmitted over a managed network connection, and rules may be applied as described based on tokens.

Some embodiments of the invention may associate a connection profile with a network connection. For example and as described, connection profile 222 may be associated with network connection 224 and the association may include using connection profile 222, e.g., by SEU 220, in order to manage transactions of data elements over network connection 224. A connection profile may be associated with, or used for managing transactions over, any number or selected set of connections.

For example, connection profile 222 may be associated with some, or even all, network connections of protected system 210 or connection profile 222 may be associated with the set of network connections that connect protected system 210 to external system 226. For example, a global connection profile may be used for a number of network connections. As shown by connection profiles 222 and 232, different connections profiles may be associated and used for, different network connection. For example, using network connection profile 232, SEU 230 may allow or enable customer names to be shared with, or sent, transmitted or forwarded to, external system 236. Accordingly, different data elements may be shared with different external systems using a plurality of network connection profiles.

A data element as referred to herein may include any data stored in a storage system, e.g., PPI data elements such as any person-specific data, asset-specific data, personal data, contact information, demographic information, financial information, purchase information, an opinion, a field of interest, a driving license, a social security number an image etc. A data element may include un-structured data as known in the art. For example, SEU 230 may use any systems or methods (e.g., deep packet inspection as known in the art) in order to identify, detect and/or extract a data element form any un-structured data communicated over a network connection.

User profiles 240 may be similar to connection profiles 222 and 232. For example, user profiles 240 may include rules as described and SEU 220 and SEU 230 may use rules in user profiles 240 as described with reference to connection profiles 222 and 232. User profiles 240 may include user specific rules or rules related to specific users. For example, user profiles 240 may indicate that the email address of John Doe is not to be shared. Accordingly, even though connection profile 222 allows sharing email addresses with external system 226 as in the above example, SEU 220 may generally allow transmission of email addresses to external system 226, based on a user specific rule related to John Doe, SEU 220 may block transmission of the email address of John Doe. Otherwise described, rules in a first profile may cause overriding of rules in another profile. User profiles 240 may be used for, or associated with, a selected set of network connections, e.g., user profiles 240 may be used to manage network traffic over network connection 224 but not used with respect to network connection 234. In some embodiments, a user profiles 240 may be a global profile, e.g., used for all network connections of a protected system thus enabling, using a single profile, to protect sensitive PII data from being shared with any entity or system.

Accordingly, some embodiments of the invention may obtain a user profile that includes one or more rules, e.g., defined and/or created by a user, or automatically created as described herein with reference to connection profiles. Some embodiments of the invention may associate a user profile with a set of network connections. For example, user profiles 240 may be associated with one of network connections 224 and 234 or with both of these connections. As described, associating a user profile (e.g., a user profile in user profiles 240) may include providing the user profile to an SEU and configuring the SEU to use rules in the profile when managing network traffic on the connection as described. In general, SEU 220 may use a user profile in ways similar to the way SEU 220 uses a network connection profile. For example, SEU 220 may receive a data unit transmitted over a network connection, identify or detect, in the data unit, a data element related to the user (e.g., the name of the user). Based on a rule in a user profile, SEU 220 may perform any of the operations described herein with respect to SEU 220, e.g., block transmission of the data unit or data element, modify the data unit or data element, forward at least a portion of the data unit or data element to a selected destination, store the data unit or data element, store metadata related to the data unit or data element or report an event related to the data unit or data element.

As described, SEU 220 and SEU 230 may store, save or record any information related to sharing of PII data elements, e.g., any event that includes sending a PII data element from protected system 210 to one of external systems 226 and 236 may be recorded or logged. As described, logging or recording an event may include storing or saving the actual PII data element sent or shared as well as metadata, e.g., when the PII data element was shared, with whom, over what connection and so on.

Any metadata related to a transaction, from a protected system to an external system may be logged. For example, metadata related to a PII data element and its transmission or sharing may be logged or stored. For example, such metadata may include information such as: when was the PII data element sent or shared, to which destination was it sent, who accessed the PII data element, what storage system was the PII data element retrieved from may be logged or recorded. Metadata may be for example information not in the PII data element itself but describing the PII data element.

Using logged and recorded data, some embodiments of the invention may present to a user a flow of PII data elements between a protected system and an external system. For example, a dashboard application as known in the art may graphically show which PII data element of which user were shared between two systems, e.g., between protected system 210 and external system 226.

A dashboard may be used in order to configure rules. For example, in some embodiments, a flow may include presenting to a user data related to a PII data element obtained by an external system from a protected system; receiving, from the user, an indication that the PII data element should not be shared (e.g., restricted); and preventing the PII data element from being transferred to the external system. For example, SEU 220 may show to an administrator PII data elements sent from protected system 210 and, based on input from the administrator, create a rule in connection profile 222. For example, a graphical user interface (GUI) tool may show an administrator a list of PII data elements sent from protected system 210 to external system 236, the administrator may click on a PII data element in the list and use a pull-down menu to set an action such as "Allow", "Block" or set any of the options described herein, e.g., with reference to Table 1 above. Input from an administrator received as described above may be used to create or update a rule in a connection profile and/or in a user profile. For example, if the administrator chose "Block" for a specific PII data element then a rule that causes SEU 220 to block or prevent sharing of the PII data element may be created, by SEU 220, in connection profile 222.

Metadata related to transaction of PII data elements, from a first external system to a second external system may be stored or logged and may be used as described herein. For example, SEU 220 may record metadata related to a flow of PII data elements from external system 226 to external system 236. For example, a flow of data between external system 226 and external system 236 may pass through SEU 220 and SEU 220 may accordingly record metadata and data related to transaction of PII data elements between these two external systems as described herein. Accordingly, a flow of PII data elements across a plurality of external systems may be recorded, logged and presented to a user as described herein.

Using data and information collected as described, a system and method according to some embodiments of the invention may present to a user a flow of PII data elements between a protected system and external systems. For example, a dashboard application may be operatively connected to SEU 220, SEU 230 and/or a storage system where SEU 220 and SEU 230 store collected data and the dashboard application may graphically present to a user any aspects of flow of PII data elements between protected system 210 and external systems 226 and 236.

A system and method according to some embodiments of the invention may receive, from a user, an indication of a sensitive or private PII data element that is not be shared (or that is to be selectively shared) and may prevent the indicated PII data element from being transferred to, or otherwise shared with, an external system. For example, a dashboard application may (e.g., graphically) present to a user a PII data element that was sent from protected system 210 to external systems 226 and the user may click on the presented data element in order to indicate that this particular data element is not to be shared. For example, based on user input (e.g., a click on a graphically presented data element) received via a dashboard or other graphical user interface (GUI) tool, SEU 220 may update connection profile 222 or user profiles 240, e.g., update or create a rule therein.

Some embodiments of the invention improve a data flow in a system by monitoring and operating on specific PII data elements. Some embodiments of the invention improve a data flow in a system by monitoring and operating on PII data elements of specific users as well as based on the user or entity that accesses the PII data elements. For example, although systems known in the art, e.g., firewalls, may block specific ports, these systems cannot block specific PII data elements as described herein. By creating and maintaining specific computer data structures (e.g., a set of rules in a connection profile as described herein), some embodiments of the invention may monitor and manage sharing of specific PII data elements with specific users, sites or applications.

Accordingly, some embodiments of the invention address a computer-centric or internet-centric challenge of monitoring, recording and managing sharing of PII data elements. Using specific data objects (e.g., rules as exemplified by Table 1), some embodiments of the invention may modify data (e.g., modify a PII data element as described) and produce new or modified data, e.g., a modified PII data element as described.

Figure 3:
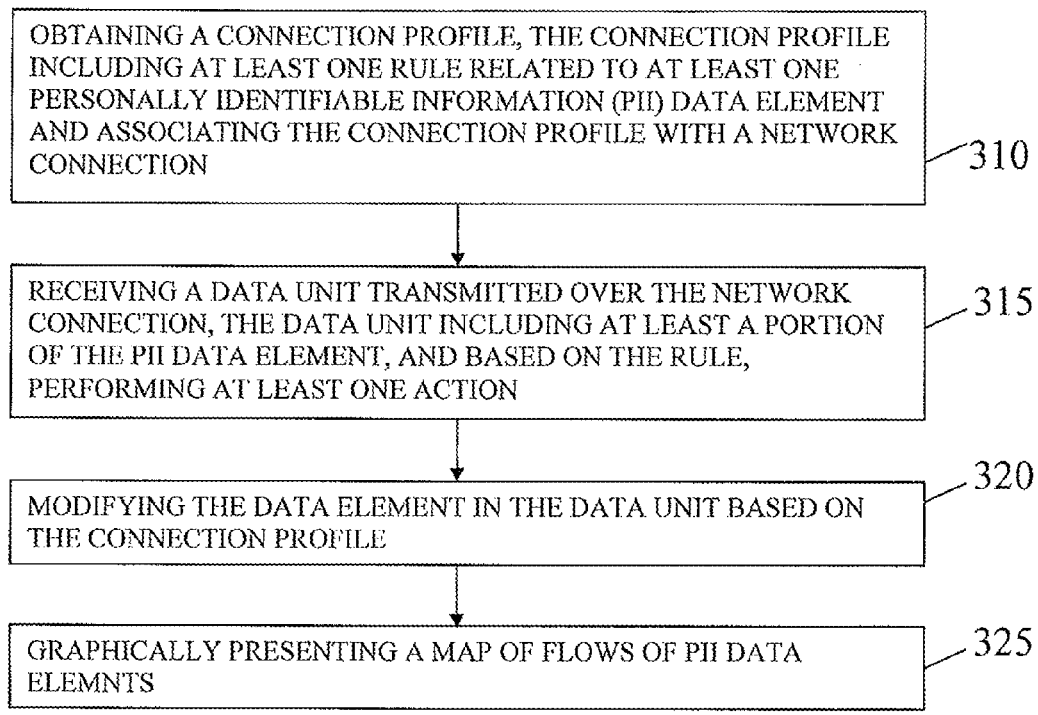
FIG. 3 shows a flowchart of a method according to illustrative embodiments of the present invention.

Reference is made to FIG. 3 which shows a flowchart of a method according to illustrative embodiments of the present invention. As shown by block 310, a connection profile that includes at least one rule related to at least one PII data element may be obtained and associated with a network connection. For example, connection profile 222 may be created by a user and/or by SEU 220 as described and may be associated with network connection 224.

Some embodiments of the invention may associate a set or plurality of network connections with a connection profile. For example, protected system 210 may be an internal system (e.g., inside or in an organization's network) and all network connections between protected system 210 and the outside world (e.g., the internet) may be associated with a global connection profile such that any PII data element sent from protected system 210 to a system that is outside the organization is subjected to rules in the global connection profile. For example, protected system 210 may be a server connected to a network in an organization (e.g., an intranet) and connections 224 and 234 may connect the server (or the intranet) to the internet, or to a server of another organization. As described, specific connection profiles may be used in addition to a global connection profile or rule set. For example, after applying or performing actions based on a global connection profile, SEU 230 may further apply rules in connection profile 232 that is associated with a specific network connection as described.

As described, rules in a connection profile may be automatically and dynamically changed by SEUs 220 and 230. In some embodiments, a set of connection profiles may all be modified based on an event or input from a user. For example, based on input from a user that indicates email addresses should not be shared, connection profile 222 and connection profile 232 may be automatically changed to include the new restriction (e.g., rules in connections profiles 222 and 232 may be created, as described, to disable sharing of email address). In some embodiments, a management system or unit (not shown) may instruct SEU 220 and SEU 230 to modify connection profiles 222 and 232 based on an event. For example, upon identifying in protected system 210, a virus known to identify and use user names, a management system may modify (or instruct SEUs 220 or 230 to modify), connection profiles 222 and 232 such that user names cannot be shared by protected system 210.

As shown by block 315, a data unit transmitted over the network connection and including at least a portion of the PII data element may be received (e.g., by SEU 220 as described) and, based on a rule in the connection profile, an action may be performed. For example and as described, SEU 220 may identify or discover a PII data element in a message sent over network connection 224 and, based on a rule in connection profile 222, perform one of: blocking transmission of the data unit that includes the PII data element, modifying the data unit, forwarding at least a portion of the data unit to a selected destination, storing the data unit, storing metadata related to the data unit, and reporting an event related to the data unit. For example, storing metadata may include logging which PII data element was accessed or shared, who accessed (or tried to access) the data element and so on. An action of reporting may include presenting to a user information such as which PII data elements were shared, with whom, when and so on.

As shown by block 320, a data element in a data unit may be modified based on a connection profile of data in a connection profile. For example, data elements, or portions thereof may be modified as described. For example, a name of a user may be removed from, or modified in, a data unit that includes a user name PII data element as described. As shown by block 325, a flow of PII data elements may be presented, e.g., a map of flows of PII data elements from or between protected system 210, external system 226 and external system 236 may be presented, e.g., graphically on a monitor or display screen.

In some embodiments, a method or flow may include monitoring and managing sharing of PII data elements based on a user profile. For example, a user profile that includes a rule related a specific user and to data elements may be configured by a user and may be associated with a set of connections. For example, user profile 240 may be associated with connection 224 and/or with network connection 234. A data unit that includes a PII data element pertaining to the user, and transmitted over one of the network connections associated with the user profile, may be received, (e.g., by SEU 230). Based on a rule in the user profile, SEU 230 may perform an action, e.g., block transmission of the data unit, modify the data unit, forward at least a portion of the data unit to a selected destination, store the data unit, store metadata related to the data unit, and report an event related to the data unit. It will be understood that any number of user profiles may be used. For example, user profiles 240 may include profiles and rules for thousands of users and, accordingly, system 200 may apply different rules for different users. For example, based on rules in user profiles 240, system 200 may enable sharing the first name of a first user and prevent sharing of the first name of a second user.

In some embodiments, a method of managing the sharing of PII data elements may include associating a connection profile with a network connection, the network connection enabling sharing of PII data elements between a protected system and an external system. For example, network connection 224 may enable, of be used for, sharing PII data elements 211 and 212 between protected system 210 and external system 226 as described. A method or flow may include intercepting transmission of a PII data element transmitted over the network connection. For example, SEU 220 may intercept a transmission of PII data element 211 from protected system 210 to external system 226. For example, communication of data from protected system 210 to external system 226 may be via SEU 220 as known in the art, e.g., SEU 220 may act as a gateway as known in the art such that some or even all data sent from protected system 210 to external system 226 must pass through, or be provided to, SEU 220 prior to being sent to external system 226. Intercepting a transmission of PII data element may include receiving the PII data element, analyzing the data element and deciding whether or not to forward the PII data element to its destination and/or deciding whether or not to modify the data element prior to sending it to its destination. A method or flow may include performing an action related to an intercepted PII data element. An action may be based on data in a connection profile. For example, data in a connection profile may include rules as described and an action (e.g., forwarding or modifying a PII data element by SEU 220) may be based on a rule in a connection profile.

For example, after intercepting, by SEU 230, a transmission of PII data element 212 from protected system 210 to external system 236, SEU 230 may find one or more rules related to PII data element 212 and may block a transmission of PII data element 212 to external system 236 (e.g., drop the packets that include PII data element 212 as known in the art). SEU 230 may, based on data in connection profile 232, modify PII data element 212, forward PII data element 212 to a destination indicated in connection profile 232, store PII data element 212, store metadata related to PII data element 212 (e.g., store information such as: when PII data element 212 was intercepted, to which destination PII data element 212 was sent and so on). SEU 230 may report an event related to an interception of a transmission of PII data element 212, e.g., any information stored, by SEU 230, in relation to PII data element 212 as described may be reported, e.g., sent to a preconfigured email address, displayed on a monitor and so on.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computer-implemented method of securing data elements, the method comprising:
   by a computing device:
   obtaining a connection profile, the connection profile including at least one rule related to at least one personally identifiable information (PII) data element;
   associating the connection profile with a network connection;
   receiving a data unit transmitted over the network connection from an external system, the data unit including at least a portion of the PII data element;
   based on the rule, performing at least one of: blocking transmission of the data unit, modifying the data unit, forwarding at least a portion of the data unit to a selected destination, storing the data unit, storing metadata related to the data unit, and reporting an event related to the data unit;
   storing metadata related to a transaction, from a protected system to the external system, of at least a portion of a PII data element included in the protected system; and
   presenting to a user a flow of PII between the protected system and the external system;
   presenting to a user PII obtained by the external system;
   receiving from a user indication of restricted PII;
   preventing the restricted PII from being transferred to the external system;
   storing metadata related to a transaction, from the external system to a second external system, of at least a portion of the PII data element; and
   presenting to a user a flow of PII data across a plurality of external systems.

2. The method of claim 1, wherein a PII data element includes at least one of: person-specific data, asset-specific data, personal data, contact info, customer demographics, financial info, purchase info, an opinion, a field of interest, a driving license, a social security number and an image.

3. The method of claim 1, comprising associating the connection profile with a set of connections.

4. The method of claim 1, comprising automatically modifying a set of connection profiles based on an event.

5. The method of claim 1, comprising graphically presenting a map of flows of data elements.

6. The method of claim 1, comprising associating a data element with a token and performing an action based on a token identified in the data unit.

7. The method of claim 1, comprising modifying a data element in the data unit based on the connection profile.

8. The method of claim 1, wherein a data element in the data unit includes un-structured data.

9. The method of claim 1, comprising:
obtaining a user profile, the user profile including at least one rule related to at least one data element;
associating the user profile with a set of network connections;
the data unit including a data element related to the user profile; and
based on the rule, related to at least one data element, performing at least one of: blocking transmission of the data unit, modifying the data unit, forwarding at least a portion of the data unit to a selected destination, storing the data unit, storing metadata related to the data unit, and reporting an event related to the data unit.

10. The method of claim 1, comprising:
defining the at least one rule based on at least one of:
  a request related to the PII data element,
  a response related to the PII data element,
  a source of a request related to the PII data element,
  a method or system used for accessing the PII data element,
  a time when the PII data element was accessed,
  a frequency of accessing the PII data element,
  a user accessing the PII data element,
  an application accessing the PII data element,
  a storage system or location of the PII data element,
  a flow that includes accessing the PII data element, and
  a pattern related to accessing the PII data element.

11. A system comprising:
a computing device with:
a memory; and
a controller configured to:
obtain a connection profile, the connection profile including at least one rule related to at least one personally identifiable information (PII) data element;
associate the connection profile with a network connection;
receive a data unit transmitted over the network connection from an external system, the data unit including at least a portion of the PII data element; and
based on the rule, perform at least one of: blocking transmission of the data unit, modifying the data unit, forwarding at least a portion of the data unit to a selected destination, storing the data unit, storing metadata related to the data unit, and reporting an event related to the data unit;
store metadata related to a transaction, from a protected system to the external system, of at least a portion of a PII data element included in the protected system;
present to a user a flow of PII between the protected system and the external system;
present to a user PII obtained by the external system;
receive from a user indication of restricted PII;
prevent the restricted PII from being transferred to the external system;
store metadata related to a transaction, from the external system to a second external system, of at least a portion of the PII data element; and
present to a user a flow of PI I data across a plurality of external systems.

12. The system of claim 11, wherein a PII data element includes at least one of: person-specific data, asset-specific data, personal data, contact info, customer demographics, financial info, purchase info, an opinion, a field of interest, a driving license, a social security number and an image.

13. The system of claim 11, wherein the controller is configured to associate the connection profile with a set of connections.

14. The system of claim 11, wherein the controller is configured to automatically modify a set of connection profiles based on an event.

15. The system of claim 11, wherein the controller is configured to graphically present a map of flows of data elements.

16. The system of claim 11, wherein the controller is configured to associate a data element with a token and perform an action based on a token identified in the data unit.

17. The system of claim 11, wherein the controller is configured to modify a data element in the data unit based on the connection profile.

18. The system of claim 11, wherein a data element in the data unit includes un-structured data.

19. The system of claim 11, wherein the controller is configured to:
obtain a user profile, the user profile including at least one rule related to at least one data element;
associate the user profile with a set of network connections;
the data unit including a data element related to the user profile; and
based on the rule related to at least one data element, perform at least one of: blocking transmission of the data unit, modifying the data unit, forwarding at least a portion of the data unit to a selected destination, storing the data unit, storing metadata related to the data unit, and reporting an event related to the data unit.

20. The system of claim 11, wherein the controller is configured to:
define the at least one rule based on at least one of:
  a request related to the PII data element,
  a response related to the PII data element,
  a source of a request related to the PII data element,
  a method or system used for accessing the PII data element,
  a time when the PII data element was accessed,
  a frequency of accessing the PII data element,
  a user accessing the PII data element,
  an application accessing the PII data element,
  a storage system or location of the PII data element,
  a flow that includes accessing the PII data element, and
  a pattern related to accessing the PII data element.

* * * * *